US009429748B2

(12) United States Patent
Chun et al.

(10) Patent No.: US 9,429,748 B2
(45) Date of Patent: *Aug. 30, 2016

(54) WEIGHT-BALANCED POLYGONAL MIRROR, LIGHT SCANNING UNIT USING THE POLYGONAL MIRROR, AND IMAGE FORMING APPARATUS

(71) Applicant: SAMSUNG ELECTRONICS CO., LTD., Suwon-si, Gyeonggi-do (KR)

(72) Inventors: Jin-kwon Chun, Suwon-si (KR); Jae-hwan Yoo, Yongin-si (KR); Won-young Cho, Suwon-si (KR); Heon-hee Lim, Suwon-si (KR); Ho-hyun Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/211,761

(22) Filed: Mar. 14, 2014

(65) Prior Publication Data

US 2014/0198171 A1 Jul. 17, 2014

Related U.S. Application Data

(63) Continuation of application No. 13/373,093, filed on Nov. 4, 2011, now Pat. No. 8,711,196.

(30) Foreign Application Priority Data

Dec. 2, 2010 (KR) .................. 10-2010-0122006

(51) Int. Cl.
*B41J 27/00* (2006.01)
*G02B 26/12* (2006.01)
(Continued)

(52) U.S. Cl.
CPC ............... *G02B 26/12* (2013.01); *B41J 2/471* (2013.01); *G02B 5/09* (2013.01); *G03G 15/04072* (2013.01)

(58) Field of Classification Search
CPC .... G02B 5/09; G02B 26/124; G02B 26/125; G02B 7/00; G02B 7/022; G02B 7/023; G02B 26/12; B41J 2/451; B41J 2/471
USPC ................. 347/261; 359/198.1, 216.1, 216
See application file for complete search history.

(56) References Cited

U.S. PATENT DOCUMENTS 5,124,830 A 6/1992 Omura et al.
7,663,785 B2 2/2010 Kim
(Continued)

FOREIGN PATENT DOCUMENTS

CN 101093375 12/2007
CN 101276055 10/2008
(Continued)

OTHER PUBLICATIONS

European Search Report dated Dec. 20, 2011 issued in corresponding European Patent Application No. 11186429.4.
(Continued)

*Primary Examiner* — Geoffrey Mruk
(74) *Attorney, Agent, or Firm* — Staas & Halsey LLP

(57) ABSTRACT

A light scanning unit includes a light source to emit a light beam; a polygonal mirror to deflect the light beam in a main scanning direction; and an imaging optical system to image the light beam onto a scanning surface. The polygonal mirror includes a plurality of reflection surfaces that are formed in an outer portion of the polygonal mirror and rotate around a rotational axis and an internal mirror surface that defines a hole. A ratio of an internal diameter d to an outer diameter D satisfies 0.1≤d/D≤0.3. The polygonal mirror is adhered to a motor unit that supports and rotates the polygonal mirror, using an adhesive. The internal mirror surface of the polygonal mirror defining the hole is point-bonded to the motor unit using the adhesive, and the point-bonding is conducted in a direction toward a corner of the reflection surfaces.

20 Claims, 6 Drawing Sheets

(51) Int. Cl.
*B41J 2/47* (2006.01)
*G02B 5/09* (2006.01)
*G03G 15/04* (2006.01)

(56) References Cited

U.S. PATENT DOCUMENTS

| | | | |
|---|---|---|---|
| 7,843,619 | B1 | 11/2010 | Song et al. |
| 8,711,196 | B2 * | 4/2014 | Chun et al. ............ 347/261 |
| 8,743,445 | B2 | 6/2014 | Itami |
| 2001/0036001 | A1 * | 11/2001 | Konno et al. ........... 359/216 |
| 2006/0039058 | A1 | 2/2006 | Mori |
| 2007/0146852 | A1 | 6/2007 | Itami |
| 2008/0239060 | A1 | 10/2008 | Jo |
| 2009/0153930 | A1 | 6/2009 | Masuda |

FOREIGN PATENT DOCUMENTS

| | | |
|---|---|---|
| JP | 3-177810 | 8/1991 |
| JP | 6-110002 | 4/1994 |
| JP | 8-190067 | 7/1996 |
| JP | 2006-39163 | 2/2006 |
| JP | 2006-58640 | 3/2006 |
| JP | 2006-251134 | 9/2006 |
| JP | 2007-171841 | 7/2007 |
| JP | 2009-145609 | 7/2009 |

OTHER PUBLICATIONS

U.S. Office Action issued Jun. 19, 2013 in copending U.S. Appl. No. 13/373,093.

U.S. Notice of Allowance issued Dec. 16, 2013 in copending U.S. Appl. No. 13/373,093.

U.S. Appl. No. 13/373,093, filed Nov. 4, 2011, Jin-kwon Chun, Samsung Electronics Co., Ltd.

Chinese Office Action issued Feb. 11, 2015 in corresponding Chinese Patent Application No. 201110396352.X.

Japanese Office Action issued Jul. 21, 2015 in corresponding Japanese Patent Application No. 2011-264558.

* cited by examiner

WEIGHT-BALANCED POLYGONAL MIRROR, LIGHT SCANNING UNIT USING THE POLYGONAL MIRROR, AND IMAGE FORMING APPARATUS

CROSS-REFERENCE TO RELATED APPLICATIONS

This application is a continuation of U.S. application Ser. No. 13/373,093, filed on Nov. 4, 2011, which claims the benefit of Korean Patent Application No. 10-2010-0122006, filed on Dec. 2, 2010, in the Korean Intellectual Property Office, the disclosures of which are incorporated herein in their entirety by reference.

BACKGROUND

1. Field

The present general inventive concept relates to a polygonal mirror, a light scanning unit using the polygonal mirror, and an image forming apparatus, and more particularly, a polygonal mirror formed of a plastic material, a light scanning unit using the polygonal mirror, and an image forming apparatus.

2. Description of the Related Art

A light scanning unit is used in electrophotographic image forming apparatuses such as laser printers, digital photocopiers, facsimiles, etc. The light scanning unit deflects a light beam irradiated from a light source to which an image signal is applied, and scans the light beam in a main scanning direction of an image carrier. Via main scanning by the light scanning unit and sub-scanning by movement of the image carrier, a latent electrostatic image is formed on the image carrier.

The light scanning unit includes a polygonal mirror assembly that deflects a light beam irradiated from a light source in an appropriate direction. Conventional polygonal mirrors are formed of a high purity aluminum having a purity of 99% or more and by superprecision processing in order to achieve a reflectivity of 85% or higher. However, the manufacturing costs of the polygonal mirror assembly formed of the aluminum described above are high, and production output thereof may be difficult to adjust.

SUMMARY

The present general inventive concept provides a polygonal mirror formed of a plastic material and capable of minimizing a decrease in performance due to heat generated or high speed rotation during an operation, a light scanning unit using the polygonal mirror, and an image forming apparatus having the polygonal mirror.

According to an aspect of the present general inventive concept, there is provided a polygonal mirror formed of a plastic, wherein the polygonal mirror comprises a plurality of reflection surfaces that are formed on an outer portion of the polygonal mirror and rotate around a rotational axis and an internal mirror surface that defines a hole, and a ratio of an internal diameter d to an outer diameter D satisfies $0.1 \leq d/D \leq 0.3$.

The outer diameter D may satisfy 10 mm $\leq$ D $\leq$ 30 mm.

The outer diameter D may be 20 mm and the internal diameter d may be 4 mm.

A thermal expansion coefficient of the plastic may satisfy $40*10^{-6}$ [1 m/m·° C.] $\leq \alpha \leq 400*10^{-6}$ [1 m/m·° C.].

The polygonal mirror may be assembled by being adhered to a motor unit that supports and rotates the polygonal mirror, using an adhesive, and a groove may be formed in the internal mirror surface to accommodate the adhesive.

The groove may be formed in a direction toward a corner of the reflection surfaces.

The groove may be formed to correspond to a vertical length of the internal mirror surface.

The groove may be formed only in an upper portion of the internal mirror surface.

The groove may be cylindrical or in the same polyhedral shape as the polygon mirror having the plurality of reflection surfaces.

A reflection layer may be formed on the plurality of reflection surfaces.

According to another aspect of the present general inventive concept, there is provided a light scanning unit comprising a light source to emit a light beam; a polygonal mirror to deflect the light beam emitted from the light source, in a main scanning direction; and an imaging optical system to image the light beam deflected by the polygonal mirror, onto a scanning surface, wherein the polygonal mirror is formed of a plastic and comprises a plurality of reflection surfaces that are formed in an outer portion of the polygonal mirror and rotate around a rotational axis and an internal mirror surface that defines a hole, wherein a ratio of an internal diameter d to an outer diameter D satisfies $0.1 \leq d/D \leq 0.3$.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

Figure 1:
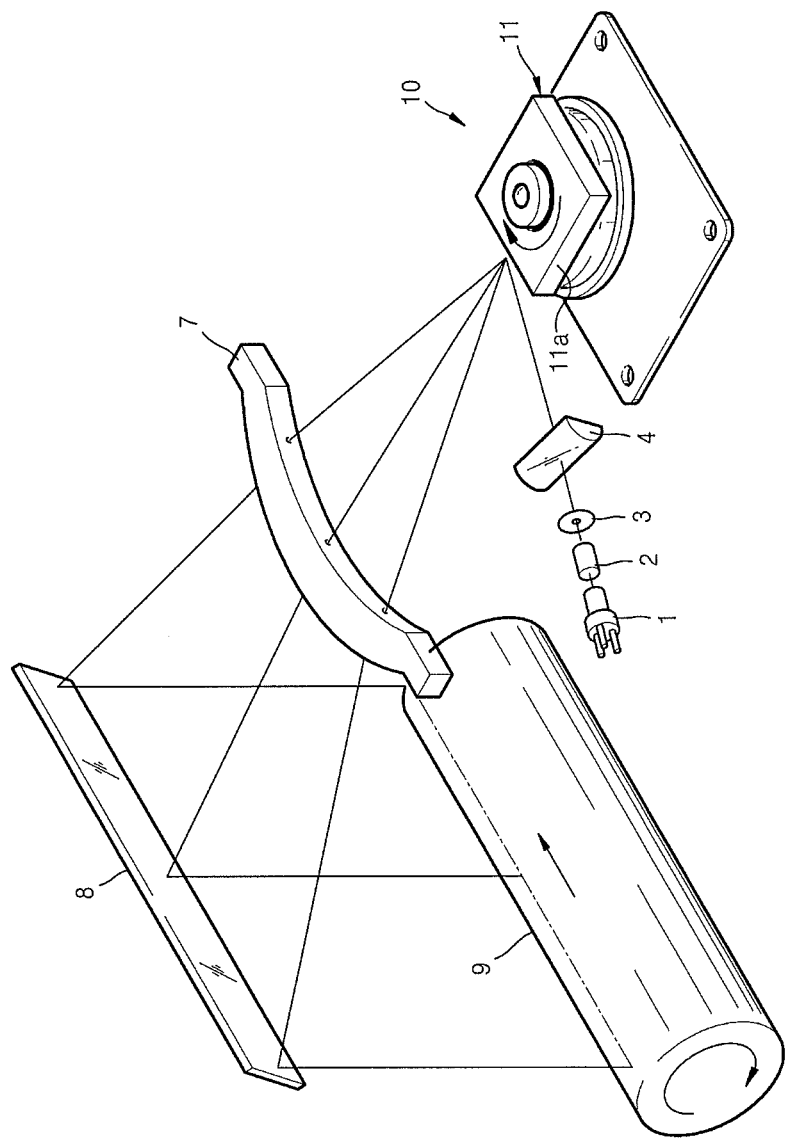
FIG. 1 is a schematic structural diagram illustrating a light scanning unit according to an embodiment of the present general inventive concept.

The present general inventive concept will now be described more fully with reference to the accompanying drawings, in which exemplary embodiments of the present general inventive concept are shown. Like reference numerals in the drawings denote like elements. In the drawings, the thicknesses of layers and regions are exaggerated for clarity.

Figure 2:
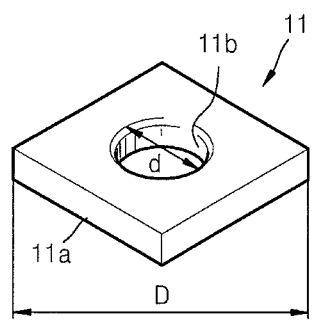
FIG. 2 is a schematic perspective view illustrating a polygonal mirror used in the light scanning unit of FIG. 1, according to an embodiment of the present general inventive concept.

FIG. 1 is a schematic structural diagram illustrating a light scanning unit, in which a polygonal mirror 11 is used, according to an embodiment of the present general inventive concept. FIG. 2 is a schematic perspective view illustrating the polygonal mirror 11 used in the light scanning unit of FIG. 1, according to an embodiment of the present general inventive concept.

Referring to FIG. 1, the light scanning unit includes a light source 1, a polygonal mirror assembly 10 that includes the polygonal mirror 11 and that rotates, and a scanning lens 7.

The light source 1 emits light beams, and may be, for example, a semiconductor laser diode that emits a laser beam. A plurality of light beams may be emitted from the light source 1. Referring to FIG. 1, one light beam is emitted from the light source 1. When a plurality of light beams are emitted from the light source 1, the plurality of light beams may be incident on one of reflection surfaces 11a of the polygonal mirror 11 at different incident angles or may be incident on different reflection surfaces 11a.

A collimating lens 2 may be disposed on a light path between the light source 1 and the polygonal mirror 11. The collimating lens 2 is a condensing lens that collimates light emitted from the light source 1. A cylindrical lens 4 may be further disposed on a light path between the collimating lens 2 and the polygonal mirror 11. The cylindrical lens 4 is an optical element having a predetermined power in only a sub-scanning direction, and focuses light that has transmitted through the collimating lens 2 onto the reflection surfaces 11a of the polygonal mirror 11 in a sub-scanning direction. Also, an aperture stop 3 may be further disposed between the collimating lens 2 and the cylindrical lens 4 to adjust a diameter of a beam. The collimating lens 2, the aperture stop 3, and the cylindrical lens 4 constitute an incident optical system of the light scanning unit.

The scanning lens 7 is an example of an imaging optical system that has a converging function and f-θ characteristics, and allows each of light beams deflected and scanned by the polygonal mirror 11 to be imaged on an outer surface of a photoconductor 9 at a constant velocity. Referring to FIG. 1, an imaging optical system is constituted by one scanning lens 7, but the imaging optical system may also be constituted by at least two lenses. A mirror 8 is an example of a light path changing unit that appropriately changes a path of a scanning light beam.

Figure 6:
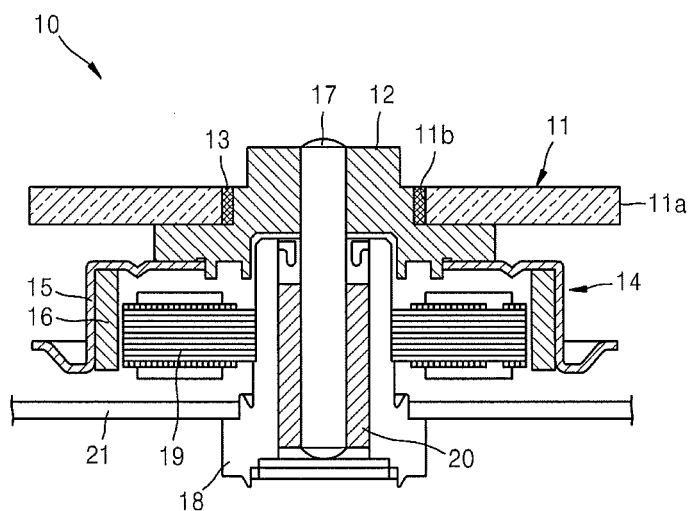
FIG. 6 illustrates an assembly of the polygonal mirror of FIG. 2, according to an embodiment of the present general inventive concept.

Referring to FIG. 2, the polygonal mirror 11 includes the plurality of reflection surfaces 11a on its outer portions and an internal mirror surface 11b defining a hole formed in a center portion of the polygonal mirror 11. The internal mirror surface 11b of the polygonal mirror 11 and an outer surface of a holder frame 12 (FIG. 6) facing the internal mirror surface 11b are coupled to each other using an adhesive 13 (FIG. 6). The polygonal mirror 11 may be formed of a plastic material by using an injection molding method. As the polygonal mirror 11 is formed of a plastic material, the manufacturing costs of the polygonal mirror 11 may be reduced, and also, due to being formed by an injection molding method, mass-production of the polygonal mirror 11 is relatively easy. A reflection layer may be formed on the reflection surfaces 11a. For example, a metal layer having a relatively good reflectivity, such as aluminum (Al) or silver (Ag), may be attached to the reflection surfaces 11a. A protection layer such as $SiO_2$ may be further formed on an outer surface of the reflection layer in order to protect the reflection layer from external environment and to prevent oxidization of the reflection layer. The polygonal mirror 11 may have a quadrangle shape in which the number of the reflection surfaces 11a is four. However, the current embodiment is not limited to the number of reflection surfaces 11a described in the above embodiment.

An operating temperature range of the light scanning unit is 50 to 60° C., and the polygonal mirror 11 rotates at a relatively high speed of more than 10000 rpm. Conventional polygonal mirrors are formed of a metal (e.g., aluminum), and thus when using the conventional polygonal mirrors in the light scanning unit, deformation of the polygonal mirrors due to heat generated in the light scanning unit or centrifugal force generated by high speed rotation is relatively small. However, the polygonal mirror 11 formed of a plastic material has a relatively low Young's Modulus, and thus the reflection surfaces 11a of the polygonal mirror 11 may be deformed in a main scanning direction due to mass thereof, heat, and centrifugal force generated by rotation. The deformation of the reflection surfaces 11a may decrease an overall printing quality due to a decrease in resolution caused by increased beam sizes and irregularities with respect to linearity of beams at various positions of the photoconductor 9 (see FIG. 1) in an image forming apparatus.

Thus, the inventors have found that deterioration of optical performance due to deformation of the reflection surfaces 11a caused by heat or high speed rotation may be minimized by limiting dimensions of the polygonal mirror 11 to ranges defined by Inequalities 1 and 2 shown below.

That is, a diagonal length of the polygonal mirror 11, that is, an outer diameter D, and a diameter corresponding to the internal mirror surface 11b, that is, an internal diameter d, may be in the ranges defined by Inequalities 1 and 2 in order to maintain an adhesion force and minimize deformation of the reflection surfaces 11a of the polygonal mirror 11.

$$0.1 \leq d/D \leq 0.3 \quad \text{[Inequality 1]}$$

$$10 \text{ mm} \leq D \leq 30 \text{ mm} \quad \text{[Inequality 2]}$$

For example, the polygonal mirror 11 may have the outer diameter D being 20 mm and the internal diameter d being 4 mm as given in Table 1.

In addition, the polygonal mirror 11 may be formed of a plastic material having a thermal expansion coefficient α that satisfies Inequality 3 below:

$$40*10^{-6}[1 \text{ m/m} \cdot ° \text{ C.}] \leq \alpha \leq 400*10^{-6}[1 \text{ m/m} \cdot ° \text{ C.}] \quad \text{[Inequality 3]}$$

For example, the polygonal mirror 11 may be formed of a plastic material such as cyclic olefin copolymer (COC), poly carbonate (PC), polymethyl methacrylate (PMMA), or cyclo-olefin polymer (COP), so as to satisfy the condition of Inequality 3.

Hereinafter, a deformation of the polygonal mirror 11 due to heat and rotation when the above conditions are met and when the above conditions are not met will be described with reference to examples.

For example, the polygonal mirror 11 according to the current embodiment may have the following properties and be under the following conditions.

TABLE 1

| | |
|---|---|
| Mirror shape | Four-sided mirror (regular square) |
| | Outer diameter (D): 20 mm |
| | Internal diameter (d): 4 mm |
| | Mirror thickness: 2.5 mm |
| Young's Modulus | $2.30 * 10^3$ MPa |
| Poisson's Ratio | 0.38 |

TABLE 1-continued

| | |
|---|---|
| Density | 1.20 *10⁻⁶ kg/mm² |
| Rotational speed | 41,000 rpm |
| Temperature | 60 □ |

Figure 3:
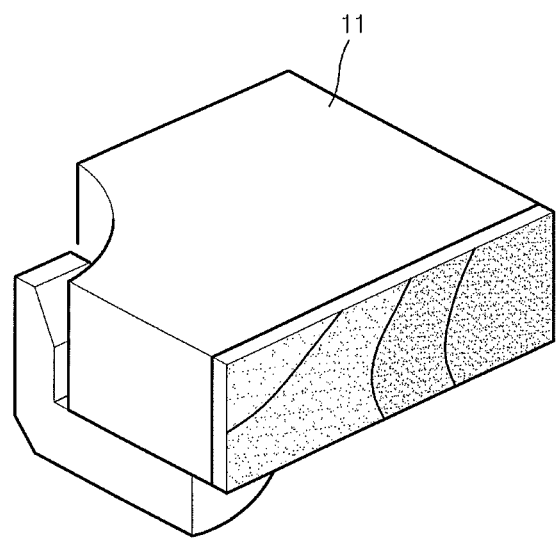
FIG. 3 illustrates a deformation of the polygonal mirror of FIG. 2 due to heat and rotation.

FIG. 3 illustrates a deformation of the polygonal mirror 11 having the properties and under the conditions shown in Table 1, by heat and rotation. In FIG. 3, an interval between contours of the reflection surfaces 11a of the polygonal mirror 11 means an elevation difference of 0.05 μm. Referring to FIG. 3, planarity of the reflection surfaces 11a of the polygonal mirror 11 that directly affects optical characteristics of the polygonal mirror 11 is only about 0.15 μm, and thus deformation of the reflection surface 11a is not greatly influenced by a temperature increase or a high speed rotation. Since the polygonal mirror 11 is usually controlled to have a tolerance of about 0.2 μm, the planarity of the polygonal mirror 11 may be within an allowable tolerance. Here, planarity may be understood as a deviation of maximums and minimums of deformation of the reflection surfaces 11a in a vertical direction of the reflection surfaces 11a.

Figure 4:
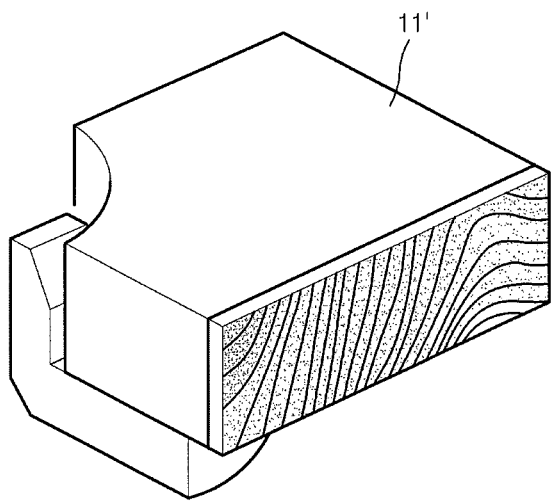
FIG. 4 illustrates a deformation of a comparative example of the polygonal mirror of FIG. 2 due to heat and rotation.

FIG. 4 illustrates a deformation of a polygonal mirror 11', as a comparative example of the polygonal mirror 11 of FIG. 2, due to heat and rotation. In FIG. 4, an interval between contours means an elevation difference of 0.05 μm.

The polygonal mirror 11' illustrated in FIG. 4 has the properties and is under the conditions shown in Table 1 except that the internal diameter d is 8 mm. Since the internal diameter d is increased, a ratio d/D of the internal diameter d to the outer diameter D is 0.4 and thus the polygonal mirror 11' does not satisfy Inequality 1. Referring to FIG. 4, planarity of the polygonal mirror 11' of the comparative example is 1.65 μm, which is relatively large. Since the polygonal usually has an allowable tolerance of about 0.2 μm, deformation of the polygonal mirror 11' of the comparative example is significantly greater than the allowable tolerance and thus has greatly reduced optical performance.

Figure 5:
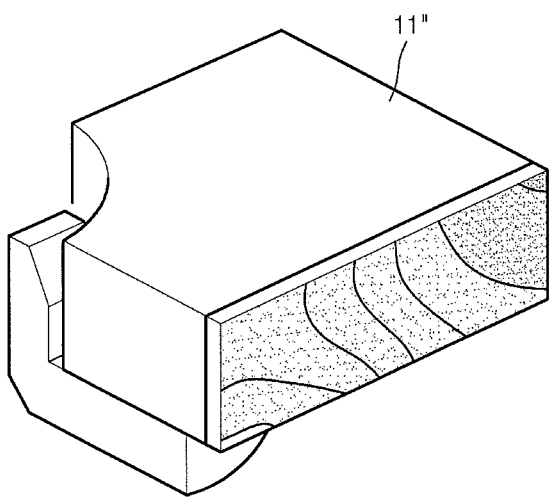
FIG. 5 illustrates a deformation of the polygonal mirror of FIG. 2, under conditions different from those of FIG. 3 due to heat and rotation.

FIG. 5 illustrates a deformation of a polygonal mirror 11", as another example of the polygonal mirror 11 of FIG. 2, due to heat and rotation, under conditions different from those of FIG. 3. In FIG. 5, an interval between contours means an elevation difference of 0.05 μm.

The polygonal mirror 11" illustrated in FIG. 5 has the properties and is under the conditions shown in Table 1 except that the internal diameter d is 6 mm. The ratio d/D of the internal diameter d to the outer diameter D is 0.3 and thus the polygonal mirror 11" does satisfy Inequality 1. Referring to FIG. 5, the interval of the contours of the polygonal mirror 11" is narrower than the interval of the contours of the polygonal mirror 11 of FIG. 3 but much wider than the interval of the contours of the polygonal mirror 11' of FIG. 4. That is, the polygonal mirror 11" illustrated in FIG. 5 is much more planar than the polygonal mirror 11' of FIG. 4.

Next, an assembly of the polygonal mirror 11 will be described. FIG. 6 illustrates an assembly 10 of the polygonal mirror 11 of FIG. 2, according to an embodiment of the present general inventive concept. Referring to FIG. 6, the polygonal mirror assembly 10 includes the polygonal mirror 11, the holder frame 12, and a motor unit 14.

The polygonal mirror 11 is adhered to the holder frame 12 using the adhesive 13. Examples of the adhesive 13 include a UV-curing adhesive, an instant glue, and a thermosetting adhesive. For example, when a UV-curing adhesive is used as the adhesive 13, the internal mirror surface 11b of the polygonal mirror 11 or the outer surface of the holder frame 12 facing the internal surface 11b may be coated with the adhesive 13, and the polygonal mirror 11 and the holder frame 12 are coupled to each other and UV light is irradiated thereon using an UV lamp, thereby quickly solidifying the adhesive 13 to fix the polygonal mirror 11 and the holder frame 12.

The motor unit 14 includes a bearing holder 18 fixed to a printed circuit board 21, an electromagnet 19 disposed around the bearing holder 18, a shaft 17 that is rotatably installed in the bearing holder 18, a bushing 20 disposed between the bearing holder 18 and the shaft 17, a rotor housing 15 coupled to the shaft 17, and a permanent magnet 16 that is provided inside the rotor housing 15 to face the electromagnet 19.

In conventional polygonal mirror assemblies, a polygonal mirror is fixed to a holder frame (or motor unit) using a plate spring. Although the plate spring causes deformation to the polygonal mirror by elastic force, since conventional polygonal mirrors are formed of a metal such as aluminum, deformation due to the plate spring may be negligible. However, when the polygonal mirror 11 is formed of a plastic, assembling using a plate spring as described above may cause significant deformation to the polygonal mirror 11. That is, a polygonal mirror formed of a metal is not greatly deformed even when being assembled by spring pressurization because the Young's modulus thereof is relatively large, and accordingly it is difficult to apply the assembling method of the conventional polygonal mirror formed of a metal to the polygonal mirror formed of a plastic material. Thus, by coupling the polygonal mirror 11 to the holder frame 12 using the adhesive 13 according to the current embodiment as described above, stress applied to the polygonal mirror 11 during assembling may be minimized. As such, deformation of the reflection surfaces 11a of the polygonal mirror 11 is minimized by minimizing the assembling stress, thereby preventing a decrease in performance of the light scanning unit.

While deformation of the reflection surfaces 11a is significantly reduced by using the adhesive 13, the reflection surfaces 11a may still be deformed by contraction of the adhesive 13. Thus, if the adhesive 13 is unevenly coated on either an upper or lower portion of the internal mirror surface 11b of the polygonal mirror 11, portions of the polygonal mirror 11 are deformed more. Thus, in order to provide uniform deformation distribution, the adhesive 13 is uniformly coated on the internal mirror surface 11b of the polygonal mirror 11 or on the outer surface of the holder frame 12 facing the internal mirror surface 11b.

Meanwhile, the polygonal mirror 11 according to the current embodiment is coupled to the motor unit 14 via the holder frame 12, but is not limited thereto. The holder frame 12 may be omitted and the shaft 17 of the motor unit 14 may be coupled directly to the polygonal mirror 11 using the adhesive 13.

Hereinafter, an operation of the light scanning unit according to the current embodiment of the present general inventive concept will be described with reference to FIGS. 1 and 2.

Light emitted from the light source 1 is sequentially transmitted through the collimating lens 2, the aperture stop 3, and the cylindrical lens 4, and is irradiated onto and reflected by the reflection surfaces 11a of the polygonal mirror 11. The light reflected by the reflection surfaces 11a of the polygonal mirror 11 passes through the scanning lens 7 and is reflected by the mirror 8, and is irradiated onto the outer surface of the photoconductor 9. When power is applied to the electromagnet 19 of the motor unit 14, the rotor housing 15 rotates around the shaft 17 due to an electromagnetic interaction between the electromagnet 19 and the permanent magnet 16. The holder frame 12 is coupled to the rotor housing 15 and the shaft 17 and rotate together therewith, and here the polygonal mirror 11 coupled to the holder frame 12 also rotates together therewith. When the polygonal mirror 11 is rotated by being driven by the motor unit 14 as described above, light reflected by the reflection surfaces 11a of the polygonal mirror 11 is scanned in a direction perpendicular to a rotational axis of the polygonal mirror 11, that is, in a main scanning direction. Meanwhile, the photoconductor 9 shifts a scanning surface in a direction perpendicular to a direction in which light is scanned by the polygonal mirror 11. Accordingly, by turning on and off the light source 1, an electrostatic latent image formed of a combination of exposed portions and non-exposed portions is formed on the outer surface of the photoconductor 9.

Figure 7:
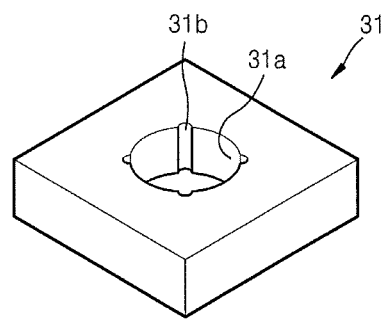
FIG. 7 illustrates a polygonal mirror according to another embodiment of the present general inventive concept.

FIG. 7 illustrates a polygonal mirror 31 according to another embodiment of the present general inventive concept. Referring to FIG. 7, the polygonal mirror 31 further includes a plurality of grooves 31b in an internal mirror surface 31a. Other parts other than for the plurality of grooves 31b in the polygonal mirror 31 are substantially the same as the polygonal mirror 11 in the previous embodiment. The grooves 31b are formed in portions of the internal mirror surface 31a where accumulated masses are relatively large, with respect to a central axis, that is, in directions toward corners of the polygonal mirror 31. For example, when the polygonal mirror 31 is a four-sided mirror as illustrated in FIG. 7, the grooves 31b are formed in four corner directions in the internal mirror surface 31a. When the polygonal mirror 31 has N reflection surfaces, N grooves 31b may be formed. The grooves 31b may be formed to correspond to a vertical length of the polygonal mirror 31.

An amount that the polygonal mirror 31 deforms when the light scanning unit operates may be determined by functions dependent on a volume, a density, a rotational speed, a form, an elastic coefficient, or a Poisson's ratio of the polygonal mirror 31. When considering data of the deformation shown in FIGS. 3 through 5, a difference in the planarity of reflection surfaces is generated by centrifugal force or heat (i.e., temperature change). For example, deformation due to centrifugal force is generated more in the corner portions of the polygonal mirror 31 by centrifugal force due to the accumulated mass. However, according to the current embodiment, deformation of the polygonal mirror 31 due to centrifugal force may be reduced by reducing the accumulated mass of the polygonal mirror 31 by using the grooves 31b formed in directions toward the corners of the polygonal mirror 31.

The adhesive 13 (FIG. 6) is filled in the plurality of grooves 31b formed in the internal mirror surface 31a of the polygonal mirror 31 to point-bond the polygonal mirror 31 and the holder frame 12 (FIG. 6). For example, when the polygonal mirror 31 is a four-sided mirror as illustrated in FIG. 7, the polygonal mirror 31 and the holder frame 12 are bonded at four points.

Figure 8:
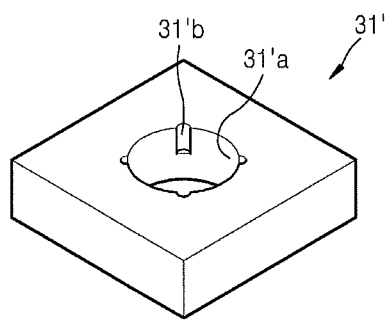
FIG. 8 illustrates a polygonal mirror according to another embodiment of the present general inventive concept.
Figure 9:
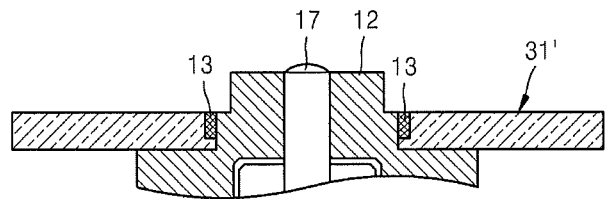
FIG. 9 illustrates an assembly of the polygonal mirror of FIG. 8.

FIG. 8 illustrates a polygonal mirror 31' according to another embodiment of the present general inventive concept. FIG. 9 illustrates an assembly of the polygonal mirror 31' of FIG. 8. Referring to FIGS. 8 and 9, the polygonal mirror 31' includes a flow preventing step 31'b formed in an internal mirror surface 31'a. Other parts other than for the flow preventing step 31'b in the polygonal mirror 31' are substantially the same as the polygonal mirror 11 in the previous embodiment. The flow preventing step 31'b may be formed to a predetermined depth in at least an upper circumferential portion of the internal mirror surface 31'b of the polygonal mirror 31'. Like the grooves 31b described above with reference to FIG. 7, since the flow preventing step 31'b is formed in directions toward corners of the polygonal mirror 31', an accumulated mass of the polygonal mirror 31' is reduced, thereby reducing deformation of the polygonal mirror 31' due to centrifugal force. Also, the adhesive 13 (FIG. 6) is filled in the flow preventing step 31'b so as to point-bond the polygonal mirror 31' and the holder frame 12 (FIG. 6). For example, when the polygonal mirror 31' is a four-sided mirror as illustrated in FIG. 8, the polygonal mirror 31' and the holder frame 12 are bonded at four points. When the bonding is performed using the adhesive 13, the adhesive 13 may leak out between the polygonal mirror 31' and the holder frame 12 before the adhesive 13 is completely hardened, which might cause the polygonal mirror 31' to be tilted with respect to the holder frame 12. Thus, the step 31'b prevents the adhesive 13 from leaking out between the polygonal mirror 31' and the holder frame 12 so that the polygonal mirror 31' is properly coupled to the holder frame 12. Like in the above-described example, when the polygonal mirror 31' has N reflection surfaces, N flow preventing steps 31'b may be provided.

Figure 10:
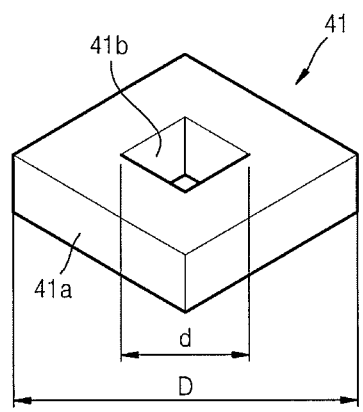
FIG. 10 illustrates another modification example of the polygonal mirror of FIG. 2.

In the above-described embodiments, the internal mirror surfaces 11b, 31a, and 31'a, that is, holes, of the polygonal mirrors 11, 11', 11", 31, and 31' have a circular cross-section, but are not limited thereto. For example, FIG. 10 illustrates a polygonal mirror 41, as another modification example of the polygonal mirror 11 of FIG. 2. Referring to FIG. 10, the polygonal mirror 41 is a four-sided mirror having four reflection surfaces 41a, and an internal mirror surface 41b that defines a hole also has four sides, and thus the internal mirror surface 41b has the same polyhedral shape as the polygonal mirror 41 having four reflection surfaces 41a. Corners of the internal mirror surface 41b are located in the same directions as corners of the reflection surfaces 41a. Accordingly, an accumulated mass of the polygonal mirror 41 at the corners of the reflection surfaces 41a is reduced, and thus deformation of the polygonal mirror 41 due to centrifugal force caused by high speed rotation may be reduced. Furthermore, in a more general way, when the polygonal mirror 41 is an N-sided mirror, the internal mirror surface 41b may have the same polyhedral shape having N sides as the N-sided mirror.

Figure 11:
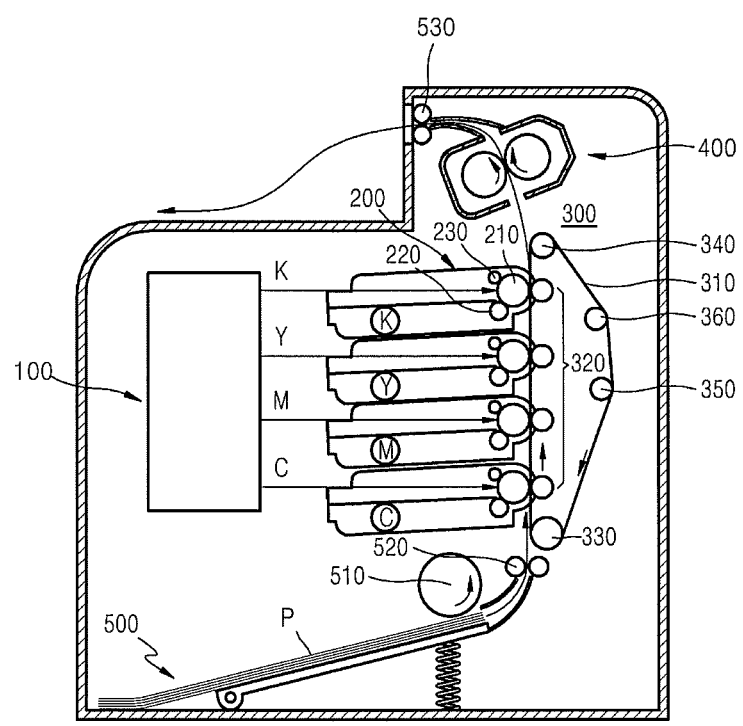
FIG. 11 is a structural diagram illustrating an electrophotographic image forming apparatus according to an embodiment of the present general inventive concept.

FIG. 11 is a structural diagram illustrating an image forming apparatus according to an embodiment of the present general inventive concept, using the light scanning unit according to the previous embodiment of the present general inventive concept.

The image forming apparatus is a dry type electrophotographic image forming apparatus for printing a color image using a dry developer (hereinafter referred to as a toner).

Referring to FIG. 11, the image forming apparatus includes a light scanning unit 100, a plurality of developing units 200, a transfer unit 300, and a fixing unit 400.

The light scanning unit 100 may be the light scanning unit 100 described above. In order to print a color image, the light scanning unit 100 scans a plurality of light beams, and the plurality of developing units 200, one for each of colors to be printed, may be formed to correspond to the plurality of light beams. In this regard, a plurality of light scanning units 100 each scanning one light beam, may be provided or the light scanning unit 100 may simultaneously scan a plurality of light beams using one polygonal mirror 10 (FIG. 1). For example, the light scanning unit 100 may scan four light beams corresponding to black (K), magenta (M), yellow (Y), and cyan (C), and four developing units 200 for black (K), magenta (M), yellow (Y), and cyan (C) may be formed.

The developing units 200 each include a photosensitive drum 210, that is, an image receptor, on which an electrostatic latent image is formed, and a developing roller 220 for developing the electrostatic latent image.

The photosensitive drum 210, that is, a photoreceptor, may be a cylindrical metal pipe having a photosensitive layer that has a predetermined thickness and is formed on an outer circumference of the cylindrical metal pipe. Although not shown herein, a photosensitive belt may be employed as the photoreceptor. The outer circumference of the photosensitive drum 210 is a surface that is to be exposed. A charge roller 230 is disposed on the outer circumference of the photosensitive drum 210 upstream from a region that is to be exposed to the light scanning unit 100. The charge roller 230 is a charging unit that contacts the photosensitive drum 210 and rotates to charge the surface of the photosensitive drum with a uniform charge. A charge bias is applied to the charge roller 230. A corona charging unit (not shown) may be used instead of the charge roller 230.

The developing roller 220 having toner adhered to its outer circumference supplies toner to the photosensitive drum 210. A development bias is applied to the developing roller 220 to supply toner to the photosensitive drum 210. Although it is not illustrated in the drawings, the developing units 200 may further include a supply roller for allowing toner contained in the developing units 200 to adhere to the developing roller 220, a restriction unit for restricting an amount of the toner adhered to the developing roller 220, and an agitator for transporting the toner contained in each of the developing units 200 to the supply roller and/or the developing roller 220.

The transfer unit 300 may include a paper transfer belt 310 and four transfer rollers 320. The paper transfer belt 310 is arranged to face a region of the outer circumference of the photosensitive drum 210 exposed out of the developing units 200. The paper transfer belt 310 circulates by being supported by a plurality of support rollers 330, 340, 350, and 360. The four transfer rollers 320 are arranged to face the photosensitive drum 210 of each developing unit 300 with the paper transfer belt 310 interposed therebetween. A transfer bias is applied to each of the transfer rollers 320.

A color image forming process that may be performed by the electrophotographic image forming apparatus configured as above will now be described.

The photosensitive drum 210 of the developing units 200 is charged to a uniform electric potential by a charge bias applied to the charging roller 230. The light scanning unit 100 scans four light beams corresponding to image information about cyan (C), magenta (M), yellow (Y), and black (K) colors to each photosensitive drum 210 of the developing units 200 to form an electrostatic latent image. A development bias is applied to the developing roller 220. Then, toner adhered to the outer circumference of the developing roller 220 adheres to the electrostatic latent image on the photosensitive drum 210 so that toner images of cyan, magenta, yellow, and black may be respectively formed on the photosensitive drum 210 of the developing unit 200.

A medium that finally receives the toner image, for example, paper P, is ejected from a cassette 500 by a pickup roller 510. The paper P is transferred to the paper transfer belt 310 by a transfer roller 520. The paper P adheres to a surface of the paper transfer belt 310 due to an electrostatic force and is transferred at the same velocity as a running linear velocity of the paper transfer belt 310.

For example, a leading end of the paper P arrives at a transfer nip at the same time as when a leading end of a toner image of cyan (C) formed on the outer circumferential surface of one photosensitive drum 210 of one developing unit 200 arrives at the transfer nip facing the transfer roller 320. When a transfer bias is applied to the transfer roller 320, the toner image formed on the photosensitive drum 210 is transferred to the paper P. As the paper P is transferred, toner images of magenta (M), yellow (Y), and black (K) formed on the photosensitive drums 210 of the other developing units 200 are sequentially transferred to the paper P to overlap with one another. Accordingly, a color toner image is formed on the paper P.

The color toner image transferred to the paper P is maintained on a surface of the paper P due to an electrostatic force. The fixing unit 400 fixes the color toner image on the paper P by using heat and pressure. The paper P after being subjected to the fixing process is ejected out of the image forming apparatus by an eject roller 530.

According to the polygonal mirror, the light scanning unit using the polygonal mirror, and the image forming apparatus according to the embodiments of the present general inventive concept, deformation of the polygonal mirror due to heat generated or high speed rotation during an operation may be minimized, thereby minimizing a decrease in performance.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An image forming apparatus comprising:
a light scanning unit comprising a light source to emit a light beam, and a polygonal mirror to deflect the light beam emitted from the light source; and
a developing unit configured to develop an electrostatic latent image formed according to the light beam emitted from the light scanning unit;
wherein the polygonal mirror comprises a plurality of reflection surfaces that are formed in an outer portion of the polygonal mirror and rotate around a rotational axis and an internal surface that defines a hole, and
the internal surface of the polygonal mirror is bonded to a motor unit that supports and rotates the polygonal mirror using an adhesive at respective positions of the motor unit that are respectively closest to vertices of the polygonal mirror.

2. The image forming apparatus of claim 1, wherein a ratio of an internal diameter d to an outer diameter D satisfies $0.1 \leq d/D \leq 0.3$.

3. The image forming apparatus of claim 2, wherein the outer diameter D satisfies $10 \text{ mm} \leq D \leq 30 \text{ mm}$.

4. The image forming apparatus of claim 1, wherein the polygonal mirror is formed of a plastic and a thermal expansion coefficient of the plastic satisfies $40*10^{-6} [1\text{m/m} \cdot °\text{C.}] \leq \alpha \leq 400*10^{-6} [1\text{m/m} \cdot °\text{C.}]$.

5. The image forming apparatus of claim 1, wherein a groove is formed in the internal surface to accommodate the adhesive.

6. The image forming apparatus of claim 5, wherein the groove is formed in a direction toward a corner of the reflection surfaces.

7. The image forming apparatus of claim 5, wherein the groove is formed to correspond to a vertical length of the internal surface.

8. The image forming apparatus of claim 5, wherein the groove is formed only in an upper portion of the internal surface.

9. The image forming apparatus of claim 5, wherein the groove is cylindrical or in the same polyhedral shape as the polygon mirror having the plurality of reflection surfaces.

10. The image forming apparatus of claim 5, wherein a holder frame is coupled to a rotational axis of the motor unit, and a portion of the holder frame is inserted into the hole of the polygonal mirror, and the internal surface of the polygonal mirror and an outer surface of the holder frame facing the internal surface are bonded using the adhesive.

11. An image forming apparatus comprising:
a light scanning unit comprising a light source to emit a light beam, and a polygonal mirror to deflect the light beam emitted from the light source; and
a developing unit configured to develop an electrostatic latent image formed according to the light beam emitted from the light scanning unit,
wherein the polygonal mirror comprises a plurality of reflection surfaces that are formed in an outer portion of the polygonal mirror and rotate around a rotational axis and an internal surface that defines a hole, and
the internal surface of the polygonal mirror is bonded to a motor unit that supports and rotates the polygonal mirror using an adhesive at respective bonding positions of the motor unit that are near reference positions at which lines extended from vertices of the polygonal mirror to center of the polygonal mirror are respectively intersected with the internal surface of the polygonal mirror.

12. The image forming apparatus of claim 11, wherein a ratio of an internal diameter d to an outer diameter D satisfies $0.1 \leq d/D \leq 0.3$.

13. The image forming apparatus of claim 11, wherein the polygonal mirror is formed of a plastic and a thermal expansion coefficient of the plastic satisfies $40*10^{-6}$ $[1m/m \cdot ^\circ C.] \leq \alpha \leq 400*10^{-6} [1m/m \cdot ^\circ C]$.

14. The image forming apparatus of claim 11, wherein a groove is formed in the internal surface to accommodate the adhesive.

15. image forming apparatus of claim 11, wherein a holder frame is coupled to a rotational axis of the motor unit, and a portion of the holder frame is inserted into the hole of the polygonal mirror, and
the internal surface of the polygonal mirror and an outer surface of the holder frame facing the internal surface are bonded using the adhesive.

16. An image forming apparatus comprising:
a light scanning unit comprising a light source to emit a light beam, and a polygonal mirror to deflect the light beam emitted from the light source; and
a developing unit configured to develop an electrostatic latent image formed according to the light beam emitted from the light scanning unit;
wherein the polygonal mirror comprises a plurality of reflection surfaces that are formed in an outer portion of the polygonal mirror and rotate around a rotational axis and an internal surface that defines a hole,
the internal surface of the polygonal mirror is bonded to a motor unit that supports and rotates the polygonal mirror using an adhesive at respective bonding positions of the motor unit, and
the bonding positions are nearer to first positions at which lines extended from vertices of the polygonal mirror to center of the polygonal mirror are respectively intersected with the internal surface of the polygonal mirror than second positions at which lines extended perpendicularly from the plurality of reflection surfaces of the polygonal mirror to center of the polygonal mirror are respectively intersected with the internal surface of the polygonal mirror.

17. The image forming apparatus of claim 16, wherein a ratio of an internal diameter d to an outer diameter D satisfies $0.1 \leq d/D \leq 0.3$.

18. The image forming apparatus of claim 16, wherein the polygonal mirror is formed of a plastic and a thermal expansion coefficient of the plastic satisfies $40*10^{-6}$ $[1m/m \cdot ^\circ C.] \leq \alpha \leq 400*10^{-6}[1m/m \cdot ^\circ C]$.

19. The image forming apparatus of claim 16, wherein a groove is formed in the internal surface to accommodate the adhesive.

20. The image forming apparatus of claim 16, wherein a holder frame is coupled to a rotational axis of the motor unit, and a portion of the holder frame is inserted into the hole of the polygonal mirror, and
the internal surface of the polygonal mirror and an outer surface of the holder frame facing the internal surface are bonded using the adhesive.

* * * * *